United States Patent [19]

Tausch

[11] 4,149,778
[45] Apr. 17, 1979

[54] BALLISTIC PROTECTED PERISCOPE CONSTRUCTION

[75] Inventor: Gerald Tausch, Salem, Ohio

[73] Assignee: Miller-Holzwarth, Inc., Salem, Ohio

[21] Appl. No.: 869,818

[22] Filed: Jan. 16, 1978

Related U.S. Application Data

[63] Continuation-in-part of Ser. No. 757,974, Jan. 10, 1977, abandoned.

[51] Int. Cl.² .............................................. G02B 23/08
[52] U.S. Cl. .................................................... 350/301
[58] Field of Search ................. 350/301, 302, 52, 287, 350/67

[56] References Cited

U.S. PATENT DOCUMENTS 2,361,050   10/1944   Paddock .............................. 350/301

FOREIGN PATENT DOCUMENTS

| | | | |
|---|---|---|---|
| 2245968 | 4/1975 | France | 350/287 |
| 2269095 | 11/1975 | France | 350/287 |
| 1244156 | 8/1971 | United Kingdom | 350/287 |

*Primary Examiner*—Jon W. Henry
*Attorney, Agent, or Firm*—Frease & Bishop

[57] ABSTRACT

A periscope has a pair of solid plastic, transparent prismatic-shaped blocks of optical material which are mounted within a protective housing which extends through an opening in an armored vehicle for safely viewing an exterior field of view from within the protected vehicle. Each of the blocks has a reflective surface and a viewing surface and are separated from each other by a void. A hollow transparent cell is mounted within and fills the void between the spaced blocks and is bonded to the blocks by a clear optical adhesive. The cell provides a shock isolation effect between the periscope block which is exposed to impact from enemy gunfire, etc., and the other periscope block located within the vehicle without affecting the physical and optical properties of the periscope. The cell reduces transmission of the shock waves between the solid blocks and prevents foreign objects from entering the void and distorting the optical viewing system. The cell preferably is filled with an inert gas such as dry nitrogen or may have a vacuum formed therein.

25 Claims, 14 Drawing Figures

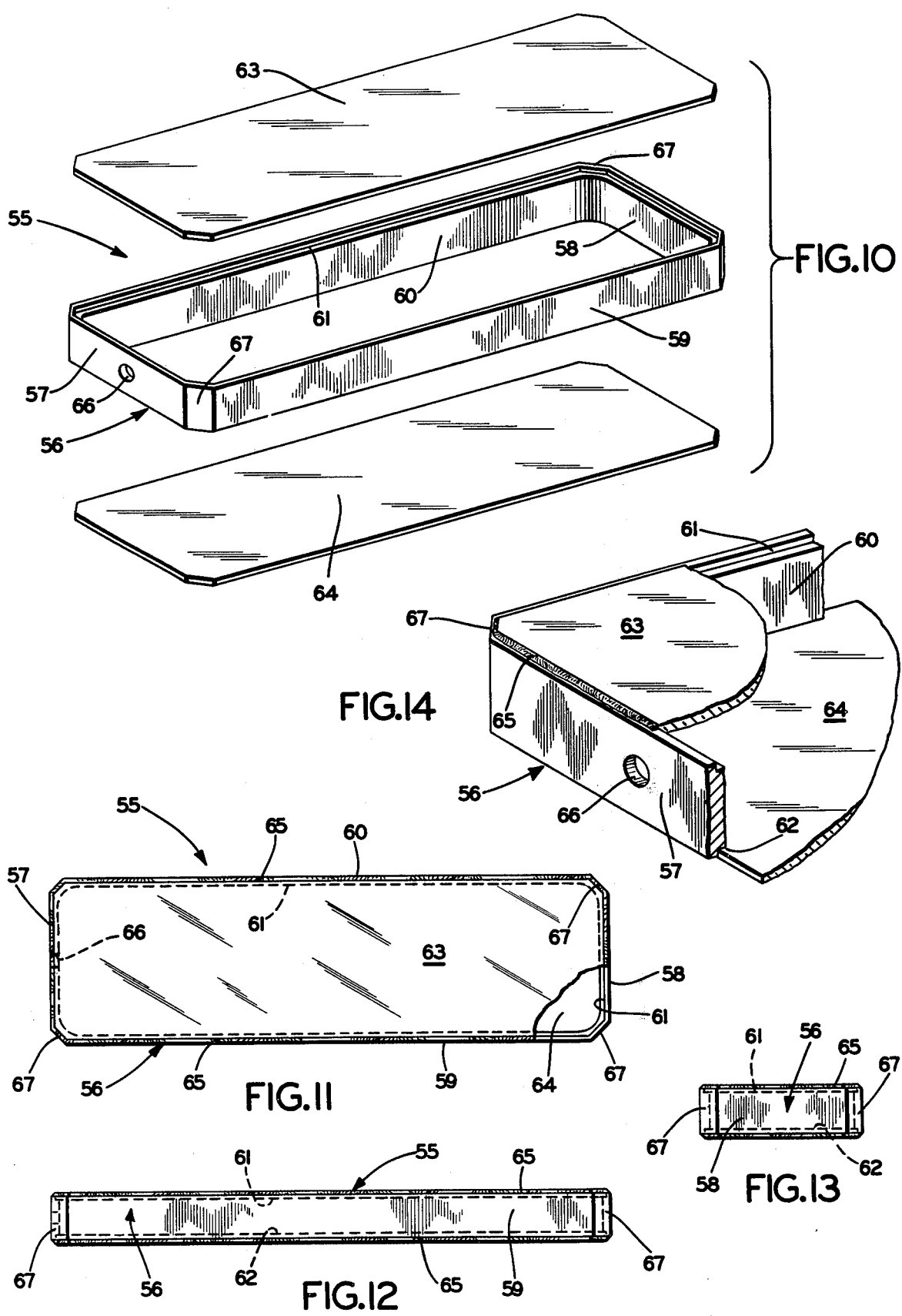

BALLISTIC PROTECTED PERISCOPE CONSTRUCTION

CROSS-REFERENCE TO RELATED APPLICATION

This application is a continuation-in-part of my copending application, Ser. No. 757,974, filed Jan. 10, 1977, now abandoned.

BACKGROUND OF THE INVENTION

1. Field of the Invention

The invention relates to periscopes for observing an exterior field of view from within a protected structure, and particularly to a periscope for armored vehicles. More particularly, the invention relates to a periscope having internal ballistic protection preventing transmission of shock waves encountered by the exterior portion of the periscope from being transmitted through the periscope and propelling fractured pieces of the periscope into the interior of the vehicle.

2. Description of the Prior Art

Numerous periscope constructions have been developed and are in use for armored vehicles such as tanks. These periscopes contain various optical systems which enable the occupants to observe a field of view exterior of the vehicle without providing a direct opening through the armor for passage of projectiles, chemicals, liquids or other harmful materials. Many periscope constructions presently used on tanks consist of a single block of clear plastic mounted within a protective housing which extends through an opening in the tank. The observer views an exterior field of view through window openings in diagonally opposite end portions of the block.

Even though the body of a periscope which provides the optical system is formed of solid plastic, it still exhibits ballistic problems. When a projectile strikes the exterior viewing window of the periscope a shock wave is transmitted through the body and causes parts and pieces of the observer window and surrounding plastic body to fly out into the interior of the vehicle and strike the observer and tank occupants. All known periscopes having solid bodies forming the optical system exhibit this problem to one degree or another.

One known approach for solving this shock wave transmission problem is to split the transparent periscope body into two sections and fill the void or space therebetween with an inert gas such as dry nitrogen to prevent the accumulation of moisture, condensation and dust. This gas filled space prevents transmission of shock waves therethrough, but requires an airtight seal formed by gaskets and adhesives which is a weak point in the periscope construction. The seal often fails because of the harsh environment to which the periscope is subjected, as well as adding considerable cost to the periscope. Periscopes such as shown in U.S. Pat. Nos. 2,361,050, 3,482,897, 3,551,020 and 3,619,040 attempt to solve this shock wave transmission problem by such gas filled voids.

The periscope construction shown in my copending application, Ser. No. 697,933, filed June 21, 1976, now U.S. Pat. No. 4,065,206 eliminates many of the problems and shortcomings of these known prior periscopes. The periscope of this invention provides a completely different approach than that of my previous construction and is believed to achieve the desired results.

No other periscope construction of which I am aware eliminates these problems in a simple, effective and inexpensive manner by formation of the optical transparent block of the periscope into a pair of sections which are separated by a transparent hollow cell filled with an inert gas or with a vacuum being formed therein to reduce the transmission of shock waves between the two sections.

SUMMARY OF THE INVENTION

Objectives of the invention include providing a periscope construction for an armored vehicle having improved ballistic protection contained within the periscope housing which prevents or greatly eliminates the transmission of shock waves through the periscope body and into the interior of the vehicle; providing such a periscope construction in which the optical system is formed of a pair of transparent generally prismatic-shaped blocks of clear solid plastic forming an object viewing section and an eyepiece viewing section, respectively, and in which the blocks are separated from direct contact with each other to form a shock absorbing gap therebetween; providing such a periscope construction in which a hollow, transparent cell filled with an inert gas is mounted within the shock absorbing gap or void formed between the pair of solid viewing blocks which reduces the transmission of shock waves between the solid blocks and which mechanically joins the block sections together and mounts the block sections within a protective housing; providing such a periscope construction in which the transparent cells can be mass produced at a different location than the other periscope components and then shipped to a central assembly plant as an integral component and then assembled with the optical viewing blocks by an optical adhesive; providing such a periscope construction in which the transparent cell is mounted within the housed periscope and is unaffected by moisture, dust and other foreign objects, and in which the configuration of the shock absorbing cell can be varied depending upon the size and configuration of the pair of transparent blocks between which it is located to provide varying amounts of shock absorption; providing such a periscope construction in which the material forming the shock absorbing cell is impervious to the contained inert gas and which provides satisfactory physical and optical properties over extended periods of time; and providing such an improved ballistic protected periscope construction which is of an extremely simple, rugged, efficient and inexpensive construction, which eliminates difficulties and solves problems, and satisfies needs which have long existed in the art.

These objectives and advantages are obtained by the improved ballistic protected periscope construction of the type having a protective housing and an optical system mounted within the housing in which the optical system includes a first transparent block of material forming an object viewing section having an object viewing surface, a first reflective surface and a first end surface; a second transparent block of material forming an eyepiece viewing section having an eyepiece viewing surface, a second reflective surface and a second end surface; the first and second transparent blocks being mounted at generally opposite ends of the protective housing with the first and second reflective surfaces and the object and eyepiece viewing surfaces being generally parallel with respect to each other and forming a parallelogram in cross section, with the first and second end surfaces being spaced from each other and forming a void therebetween; and shock absorbing means mounted within and filling the void between the first and second end surfaces of the first and second transparent blocks, with the shock absorbing means including a hollow cell having at least first and second spaced parallel transparent walls, with said walls being located adjacent said first and second block end surfaces to reduce the transmission of shock waves between said blocks, and with the hollow cell being filled with an inert gas or formed with a vacuum.

BRIEF DESCRIPTION OF THE DRAWINGS

Preferred embodiments of the invention—illustrative of the best modes in which applicant has contemplated applying the principle—are set forth in the following description and shown in the accompanying drawings, and are particularly and distinctly pointed out and set forth in the appended claims.

FIG. 10 is an enlarged, exploded perspective view of another modified shock absorbing cell construction;

FIG. 11 is a top plan view of the cell construction, shown in FIG. 10, in assembled condition;

FIG. 12 is a front elevational view of the cell construction shown in FIG. 11;

FIG. 13 is an end elevational view of the cell construction shown in FIGS. 11 and 12; and FIG. 14 is a greatly enlarged fragmentary view, with portions broken away and in section, of the upper left-hand corner of FIG. 11.

Similar numerals refer to similar parts throughout the drawings.

DESCRIPTION OF THE PREFERRED EMBODIMENTS

First Embodiment

Figure 1:
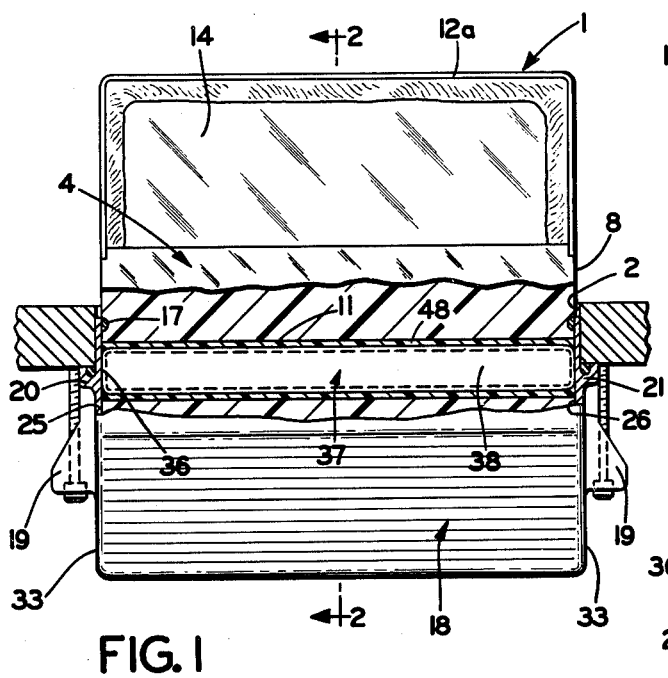
FIG. 1 is a front elevational view of the improved periscope construction mounted on a fragmentary part of an armored vehicle, with portions broken away and in section showing the hollow glass cell mounted within the shock isolation gap.
Figure 2:
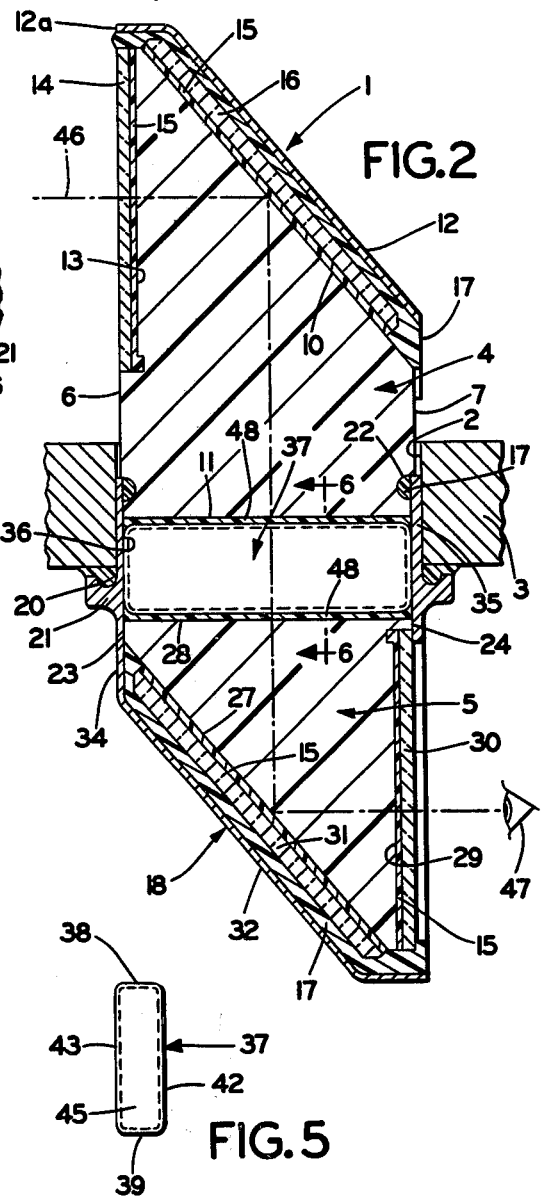
FIG. 2 is an enlarged vertical sectional view taken on line 2—2, FIG. 1.

The improved ballistic protected periscope construction is indicated generally at 1, and is shown particularly in FIGS. 1 and 2, mounted within an opening 2 of a section of armor plate 3. Periscope 1 includes a pair of transparent blocks 4 and 5 formed of a clear plastic material of optical quality, such as methyl methacrylate. Upper block 4 is referred to as the object viewing section and is located substantially exterior of the armored vehicle with block 5 being referred to as the eyepiece viewing section and is located substantially within the interior of the vehicle.

Block 4 preferably has a generally prismatic shape formed with opposed parallel front and rear planar surfaces 6 and 7, and a pair of opposed parallel planar end surfaces 8 and 9. Front and rear surfaces 6 and 7 are connected by an angled top surface 10 and a bottom surface 11. Front surface 6 is formed with a vertically extending recessed object viewing surface 13 having a clear window glass 14 mounted thereon by a clear optical adhesive 15. A reflective mirror 16 is mounted on angled top surface 10 by optical adhesive 15. Block 4 is contained within a protective housing cover 12 and is secured therein by a sealing adhesive 17. Housing cover 12 is formed with a window opening 12a which aligns with object viewing surface 13 and window glass 14.

Eyepiece viewing block 5 is contained within a protective housing cover 18 which is secured to armor plate 3 by a pair of end mounting lugs 19. A rectangular rubber sealing gasket 20 is mounted between armor plate 3 and a gasket receiving flange 21, formed on housing 18 for effectively sealing armor plate opening 2. The upper end of housing cover 18 is sealed with and secured to upper transparent block 4 by a peripheral groove 22 formed in block 4 which is filled with sealing adhesive 17.

Eyepiece block 5 (FIG. 2) has a generally prismatic shape similar to block 4, and includes opposed parallel front and rear planar surfaces 23 and 24 and a pair of opposed planar end surfaces 25 and 26. An angled planar surface 27 and a planar top surface 28 extend between surfaces 23-26 to complete the shape of block 5. Block 5 includes a vertically extending eyepiece viewing surface 29 having a clear window glass 30 mounted thereon by optical adhesive 15. A mirror 31 is mounted on angled surface 27 by optical adhesive 15. Block 5 is mounted within housing cover 18 by sealing adhesive 17 which bonds bottom block 5 to angled wall 32, side walls 33, and front and rear walls 34 and 35 of housing cover 18.

Bottom surface 11 of object viewing block 4 is spaced from surface 28 of eyepiece viewing block 5 forming a void 36 therebetween. Void 36 preferably extends throughout the length and width of blocks 4 and 5 between front and rear walls 34 and 35 and side wall 33 of housing cover 18, as shown in FIGS. 1 and 2.

In accordance with the invention, a hollow cell, indicated generally at 37 (FIGS. 3, 4 and 5), is mounted between blocks 4 and 5 in void 36, as shown in FIG. 1 and 2. Cell 37 is formed of glass having a pair of spaced parallel front and rear walls 38 and 39, a pair of spaced parallel end walls 40 and 41, and a pair of spaced parallel top and bottom walls 42 and 43. All of these cell forming walls extend transversely with respect to each other providing a rectangular shape to cell 37. Walls 38-43 are relatively thin with respect to the overall size of cell 37 and preferably are formed of inexpensive transparent glass or plastic material.

Walls 38-43 provide a hollow interior 45 within cell 37, which preferably is filled with an inert gas such as dry nitrogen. If desired, a vacuum may be formed within hollow interior 45 instead of filling the interior with an inert gas. This inert gas or vacuum prevents the distortion of the light rays which pass therethrough, shown diagrammatically by dot-dash line 46 (FIG. 5)

for viewing by an observer 47 located within the armored vehicle. Likewise, the absence of usual atmospheric air within interior 45 of cell 37 prevents the accumulation of moisture and subsequent distortion of the rays.

Figure 6:
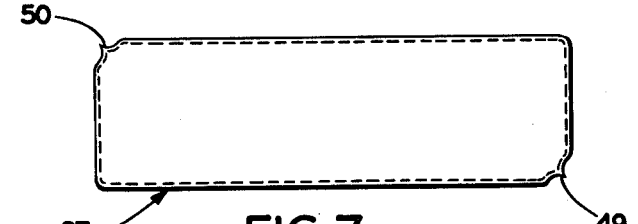
FIG. 6 is an enlarged fragmentary sectional view taken on line 6—6, FIG. 2.

Cell 37 is mounted within void 36 by optical adhesive 48 which is a clear adhesive preferably the same or similar to optical adhesive 15. Adhesive 48 bonds top and bottom cell walls 42 and 43 to surfaces 11 and 28, respectively, of blocks 4 and 5 (FIGS. 1, 2 and 6). Cell 37, when mounted between blocks 4 and 5, forms a ballistic protected optical viewing system which in turn is secured within protective housings 12 and 18 for mounting within opening 2 of the armored vehicle.

Figure 3:
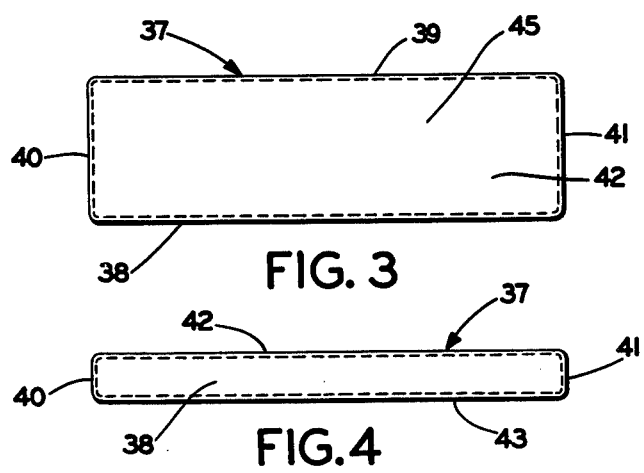
FIG. 3 is a top plan view of the shock absorbing glass cell removed from the assembled periscope of FIG. 1.
Figure 4:
FIG. 4 is a front elevation of the shock absorbing cell of FIG. 3.
Figure 5:
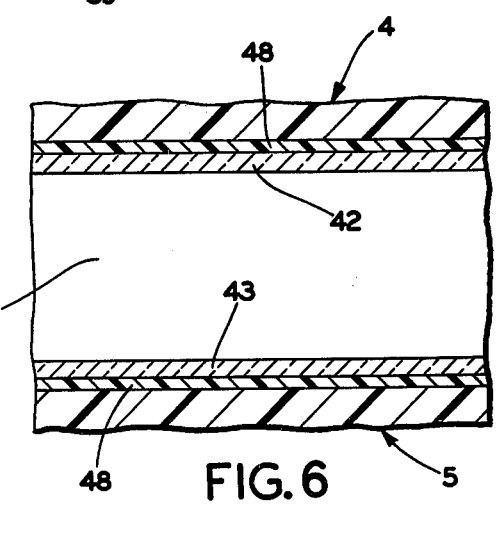
FIG. 5 is an end elevation of the shock absorbing cell of FIG. 3.
Figure 7:
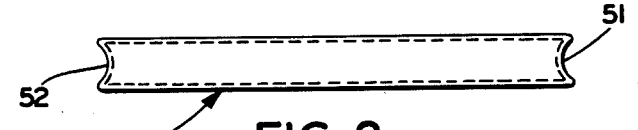
FIG. 7 is a top plan view similar to FIG. 3, showing a modified configuration of the shock absorbing cell of FIGS. 3, 4 and 5.
Figure 8:
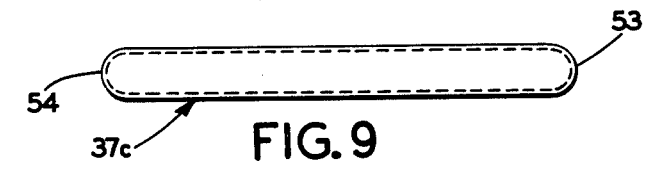
FIG. 8 is a front elevational view, similar to FIG. 4, showing a modified shock absorbing cell in which the end walls are formed with a concave configuration.
Figure 9:
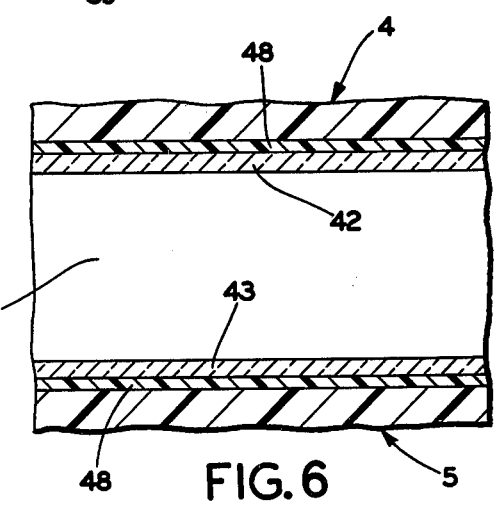
FIG. 9 is a front elevational view, similar to FIGS. 4 and 8, showing another modified shock absorbing cell construction in which the end walls are formed with a convex configuration.

Cell 37 need not have the particular rectangular configuration shown in FIGS. 3, 4 and 5, and can have various modifications such as shown in FIGS. 7, 8 and 9. Modified cell 37a of FIG. 7 shows the formation of a pair of diagonally located crimped corners 49 and 50 through which the air is removed and the inert gas injected during a usual glass molding technique. FIG. 8 shows another modified cell construction 37b in which end walls 51 and 52 are formed with a concave configuration. FIG. 9 shows still another slightly modified cell construction 37c in which end walls 53 and 54 have a convex configuration.

Second Embodiment

A modified form of the hollow cell construction is indicated generally at 55 and is shown in FIGS. 10-14. Cell 55 includes a rectangular-shaped integral metal frame 56 which is formed by a pair of spaced parallel end walls 57-58 and a pair of spaced parallel front and back walls 59 and 60. Walls 57-58 and 59-60 are joined to each other by angled corners 67. Inner peripheral shoulders 61 and 62 are formed about the top and bottom edges of frame walls 57-60.

A pair of rectangular-shaped transparent sheets of material 63 and 64 (preferably formed of glass) are mounted on shoulders 61 and 62, respectively, to enclose frame 56 and form hollow cell 55. Glass sheets 63-64 form the top and bottom walls, respectively, of cell 55 and are bonded or secured to frame 56 within shoulders 61 and 62 by beads of adhesive 65 which extend about the top and bottom edges of the frame walls.

An opening 66 is formed in end wall 57 for withdrawing the air from within cell 55 after assembly, and for filling the hollow interior of cell 55 with an inert gas, such as dry nitrogen. A suitable plug or other closure means (not shown) is placed in opening 66 to seal the same after insertion of the inert gas.

Assembled cell 55 is mounted within void 36 that is formed between transparent blocks 4 and 5 by an optical adhesive, in a similar manner as described above for cells 37 and 37a-c, in order to provide ballistic protection to periscope 1.

Modified cell 55 enables usual flat, relatively thin sheets of glass 63 and 64 to be bonded within the shoulders of an extremely simple and inexpensive metal frame to provide the desired ballistic protection as an alternative to the integral molded glass cell constructions 37 and 37a-c. If desired, sheets 63 and 64 may be formed of a transparent plastic or similar synthetic material without departing from the concept of the invention.

One of the important features of cell constructions 37, 37a-c, and 55 is the providing of a pair of spaced, planar top and bottom transparent surfaces 42-43 and 63-64 of optical quality. Such smooth surfaces prevent the formation of a lense effect which will distort the passing light rays when mounted in abutting adjacent relationship with corresponding block surfaces 11 and 28 by adhesive 48, shown exaggerated in FIG. 6.

The arrangements and configurations of the various cell end walls, as well as the front and rear walls (also referred to as spaced side walls) which also may be modified accordingly, enable various manufacturing procedures and particularly glass forming procedures and techniques to be used in the manufacture of the various cells, and for the replacement of air with inert gas. The particular procedure of the air removal and gas injection forms no part of the invention, and therefore is not described in detail.

A shock wave is generated in upper block 4 upon object viewing surface 13 and window 14 being struck by a projectile. The shock wave is transmitted downwardly through solid block 4 and would be transmitted into and through solid block 5 causing pieces and particles of glass 30 and body 5 to fly into the face of an observer looking through the periscope, were it not for the shock isolation cell. The cell in most instances will be destroyed upon viewing surface 13 being struck with sufficient force by a projectile. The cell, however, will have performed its intended purpose by stopping or sufficiently reducing the transmission of the shock waves generated to prevent injury to the occupants of the armored vehicle. The destruction of the cell is not detrimental to the periscope construction since in most instances, upper block 4 is destroyed when struck with sufficient force by a projectile, requiring replacement of periscope 1 whether the cell is damaged or intact.

Accordingly, improved periscope construction 1 provides a gap or void which is filled with a shock absorbing, hollow, transparent cell which is mounted within the interior of the periscope and concealed within the protective housing, and which is relatively unaffected by the harsh environment to which the periscopes are subjected when mounted on an armored vehicle; provides a periscope construction which enables a wide range of shock absorbing characteristics to be achieved by varying the spacing between top and bottom walls 42-43 and 63-64 or by placing several smaller cells in a stacked configuration within the void between blocks 4 and 5; provides a periscope construction which eliminates the need for an expensive and maintenance prone air or gas-filled space, as in prior constructions using such a gas filled shock isolation zone in which the gas is injected directly between the spaced periscope blocks in a chamber formed therebetween by separate sealing walls or gaskets extending between the spaced blocks; provides such a periscope construction in which the hollow, gas-filled transparent cells may be mass produced at a distant location where glass making or other fabricating equipment is available, and then shipped in quantity to a different site to be assembled by adhesive 48 between blocks 4 and 5 and later mounted within protective housings 12 and 18; and provides such a periscope construction which enables the necessary physical and optical properties to be maintained by such an extremely simple, rugged and inexpensive configuration, which configuration eliminates difficulties encountered with prior devices and achieves the objectives indicated and solves problems existing in the art.

In the foregoing description certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved ballistic protected periscope construction is constructed and used, the characteristics of the construction, and the advantageous, new and useful results obtained; the new and useful structures, devices, elements, arrangements, parts, and combinations, are set forth in the appended claims.

I claim:

1. A periscope construction of the type having a protective housing and an optical system mounted within the housing, in which the optical system includes:
   (a) a first block of optical material forming an object viewing section having an object viewing surface, a first reflective surface and a first end surface;
   (b) a second block of optical material forming an eyepiece viewing section having an eyepiece viewing surface, a second reflective surface, and a second end surface;
   (c) said first and second blocks being mounted at generally opposite ends of the protective housing with the first and second reflective surfaces, and the object and eyepiece viewing surfaces being generally parallel with respect to each other and forming a parallelogram in cross section, and with the first and second end surfaces being spaced from each other and forming a void therebetween; and
   (d) shock absorbing means mounted within and filling the void between the first and second end surfaces of the first and second blocks, with said shock absorbing means including hollow cell means having at least first and second spaced parallel transparent walls, with said walls being located adjacent said first and second block end surfaces, respectively, with said cell means being adapted to reduce the transmission of shock waves between said blocks when the object viewing section is struck by a projectile.

2. The construction defined in claim 1 in which the hollow cell means is filled with an inert gas.

3. The construction defined in claim 2 in which the inert gas is dry nitrogen.

4. The construction defined in claim 1 in which a vacuum is formed within the hollow cell means.

5. The construction defined in claim 1 in which the cell means is formed of glass and includes a pair of parallel spaced side walls and a pair of parallel spaced end walls, and in which said pairs of side and end walls form an integral glass cell together with the first and second spaced parallel transparent walls; and in which said glass cell has a rectangular cross-sectional configuration.

6. The construction defined in claim 1 in which the cell means is formed of glass and includes a pair of spaced irregularly shaped end walls extending between the spaced parallel first and second walls.

7. The construction defined in claim 1 in which the first and second walls of the cell means are bonded to a respective block end surface by an optical adhesive.

8. The construction defined in claim 1 in which the cell means includes a metal frame; and in which the first and second transparent walls are mounted on and enclose the metal frame to form the hollow cell means.

9. The construction defined in claim 8 in which the frame has a continuous, generally rectangular configuration and forms pairs of spaced side and end walls of the cell means; in which the first and second walls are planar, transparent sheets of material; and in which said transparent sheets are mounted in a spaced parallel relationship on a respective top and bottom portion of the frame means to enclose the frame means and form the hollow cell means.

10. The construction defined in claim 9 in which the first and second transparent sheets are formed of glass; and in which the glass sheets are bonded by an adhesive to the frame.

11. The construction defined in claim 9 in which opening means is formed in the frame for filling the cell means with an inert gas.

12. The construction defined in claim 9 in which shoulder means are formed on the top and bottom portions of the frame; in which the first and second transparent walls are mounted on said shoulders; and in which adhesive means bonds the transparent walls to the frame.

13. A ballistic protected periscope construction adapted to be mounted on an armor vehicle including:
   (a) housing means;
   (b) a first solid block of transparent material mounted within the housing means and partially exposed to the exterior of the vehicle and susceptible to be struck by a projectile;
   (c) a second solid block of transparent material mounted within the housing means and partially exposed to the interior of the vehicle, with said first and second blocks forming part of an optical system for viewing an exterior field of view from within the armored vehicle through said blocks; and
   (d) hollow, transparent integral glass cell means mounted between the first and second blocks to reduce the transmission of shock waves between said blocks when the first block is struck by a projectile.

14. The construction defined in claim 13 in which the glass cell means is formed with at least a pair of spaced parallel walls, with each of said walls being located adjacent to a respective one of the first and second blocks.

15. The construction defined in claim 13 in which the cell means is filled with an inert gas.

16. The construction defined in claim 15 in which the inert gas is dry nitrogen.

17. The construction defined in claim 13 in which the cell means has a generally rectangular cross-sectional configuration with at least a pair of spaced parallel walls; in which the first and second blocks each have a flat surface, which surfaces are parallel to each other and define the vertical spacing of the gap between the blocks; and in which each of said cell means parallel walls is bonded to a respective flat surface of said first and second blocks.

18. The construction defined in claim 17 in which a clear optical adhesive bonds the cell means parallel walls to the block surfaces.

19. In an improved periscope construction of the type having a pair of generally prismatic-shaped blocks of optical material, each having a viewing window and a reflector surface, which blocks are mounted within a protective housing and form an optical system for viewing an external field of view from within the interior of a protected object, wherein the improvement includes: hollow cell means having at least a pair of spaced, transparent top and bottom walls, said cell means being mounted between the pair of blocks with each of said walls being located adjacent a respective block, for reducing the transmission of shock waves between said blocks when one of the blocks is struck by a projectile.

20. The construction defined in claim 19 in which the hollow cell means is filled with an inert gas.

21. The construction defined in claim 19 in which the cell means also includes a pair of spaced end walls and a pair of spaced side walls; and in which said end walls, said walls, and top and bottom walls form a parallelepiped.

22. The construction defined in claim 21 in which the end and side walls are formed by a rectangular-shaped metal frame; in which shoulder means are formed on the frame adjacent the top and bottom thereof; and in which the top and bottom transparent walls are flat sheets of transparent material which are mounted on the frame shoulders.

23. The construction defined in claim 22 in which opening means is formed in the frame for filling the hollow cell with an inert gas.

24. The construction defined in claim 22 in which the top and bottom transparent walls are formed of glass.

25. The construction defined in claim 19 in which each of the top and bottom walls of the cell means is bonded to a respective one of the pair of plastic blocks.

* * * * *

UNITED STATES PATENT AND TRADEMARK OFFICE
CERTIFICATE OF CORRECTION

PATENT NO. : 4,149,778
DATED : April 17, 1979
INVENTOR(S) : Gerald Tausch

It is certified that error appears in the above—identified patent and that said Letters Patent are hereby corrected as shown below:

Column 4, line 52, change "FIG." to -- FIGS. --

Column 10, line 2, change "said" to -- side --

Signed and Sealed this

Seventh Day of August 1979

[SEAL]

Attest:

Attesting Officer

LUTRELLE F. PARKER
Acting Commissioner of Patents and Trademarks